United States Patent [19]

Abel

[11] 4,317,892

[45] Mar. 2, 1982

[54] BARRIER LAYER BETWEEN REACTANTS IN PHOTOGRAPHIC PRODUCTS COMPRISING A MIXTURE OF VINYLIDENE CHLORIDE TERPOLYMER AND POLYMERIC CARBOXY-ESTER-LACTONE

[75] Inventor: Edward P. Abel, Webster, N.Y.

[73] Assignee: Eastman Kodak Company, Rochester, N.Y.

[21] Appl. No.: 174,960

[22] Filed: Aug. 4, 1980

Related U.S. Application Data

[62] Division of Ser. No. 948,062, Oct. 2, 1978, Pat. No. 4,229,516.

[51] Int. Cl.$^3$ ................................................ C08F 8/16
[52] U.S. Cl. .................................... 525/194; 525/185; 525/190
[58] Field of Search ...................... 525/194, 185, 190

[56] References Cited

U.S. PATENT DOCUMENTS

| | | | |
|---|---|---|---|
| 3,626,031 | 12/1971 | Chambers | 525/194 |
| 4,056,394 | 11/1977 | Hannie | 428/500 |
| 4,061,496 | 12/1977 | Hannie | 428/510 |

OTHER PUBLICATIONS

Research Disclosure: "Neutralizing Materials in Photographic Elements", #12331, vol. 123, 7/1974, pp. 22–24.

*Primary Examiner*—Paul Lieberman
*Attorney, Agent, or Firm*—Arthur H. Rosenstein

[57] ABSTRACT

A composition comprising a mixture of (1) from 5 to 95 percent by weight of a copolymer comprising from 55 to 85 percent by weight of vinylidene chloride, 5 to 35 percent by weight of an ethylenically unsaturated monomer, and 0 to 20 percent by weight of an ethylenically unsaturated carboxylic acid, and (2) from 5 to 95 percent by weight of a polymeric carboxy-ester-lactone, is useful as a temporary barrier between reactants in photographic products. The barrier is particularly useful as a process timing layer in color image transfer film units.

13 Claims, No Drawings

BARRIER LAYER BETWEEN REACTANTS IN PHOTOGRAPHIC PRODUCTS COMPRISING A MIXTURE OF VINYLIDENE CHLORIDE TERPOLYMER AND POLYMERIC CARBOXY-ESTER-LACTONE

This is a division of application Ser. No. 948,062, filed Oct. 2, 1978 U.S. Pat. No. 4,229,516.

BACKGROUND OF THE INVENTION (1) Field of the Invention

This invention relates to temporary barriers which delay the contact of one reactant with another reactant in photographic elements and more particularly to color diffusion transfer film units wherein one portion of the film unit is temporarily isolated from another portion by a barrier layer comprising a mixture of (1) from 5 to 95 percent by weight of a copolymer comprising from 55 to 85 percent by weight of vinylidene chloride, 5 to 35 percent by weight of an ethylenically unsaturated monomer and 0 to 20 percent by weight of an ethylenically unsaturated carboxylic acid, and (2) from 5 to 95 percent by weight of a polymeric carboxy-ester-lactone.

(2) Description Relative to the Prior Art

Interlayers have been used in multicolor photographic elements to aid in differential processing of various silver halide emulsions after exposure and to minimize the effects of one layer of the element on another when both are simultaneously undergoing similar treatment as disclosed by Neblett, *Photography, Its Materials and Processes*, 1962, Chapter 33. The use of improved interlayers in a multicolor image transfer film unit is well known, for example, as disclosed in U.S. Pat. Nos. 3,411,904 and 3,418,117, both by Becker. The interlayers in many of the known film units act as temporary barriers to isolate the reactants of the surrounded layers for a predetermined length of time.

Image transfer processes are well known in the art which employ a single processing solution to develop an exposed image record and produce a viewable image record. In many instances, after-treatments such as washing or stabilizing baths are not used in these image transfer processes, since the element is a fully self-contained film unit.

In certain instances, various barrier layers, timing layers or spacer layers have been used in image transfer film units to delay action between the ingredients of various layers of the image transfer film unit. Barrier layers have been used between polymeric acid layers and the silver halide emulsion layers of an image transfer film unit to allow processing to continue at a high pH for a predetermined period of time before the acid layer becomes effective in neutralizing the processing composition as disclosed in U.S. Pat. No. 2,584,030, issued Jan. 29, 1952.

The use of barriers or spacer layers employed in conjunction with neutralizing layers in one commercial image transfer product is described by Friedman, *History of Color Photography*, 1968, pages 538 through 543. In products of this type, the alkaline composition penetrates through the barrier layer and alkali is depleted throughout the structure by the acid in the neutralizing layers. In certain instances, breakdown of the barrier layers releases materials which serve as a shutoff mechanism, establishing the amount of silver halide development and the related amount of dye formed according to the respective exposure values.

Various formats for color diffusion transfer assemblages are described in the prior art, such as U.S. Pat. Nos. 2,543,181; 2,983,606; 3,362,819; 3,362,821; 3,592,645; 3,785,815; 3,415,644; 3,415,645; 3,415,646; 3,647,437; 3,635,707 and 3,756,815, and Canadian Pat. Nos. 928,559 and 674,082. In these formats, the image-receiving layer containing the photographic image for viewing can be separated from the photographic layers after processing or, in some embodiments, it can remain permanently attached and integral with the image-generating and ancillary layers present in the structure when a transparent support is employed on the viewing side of the assemblage. The image is formed by color-providing substances released from the image-generating units, diffusing through the layers of the structure to the dye image-receiving layer. After exposure of the assemblage, an alkaline processing composition permeates the various layers to initiate development of the exposed photosensitive silver halide emulsion layers. The emulsion layers are developed in proportion to the extent of the respective exposures, and the image dyes which are formed or released in the respective image-generating layers begin to diffuse throughout the structure. At least a portion of the imagewise distribution of color-providing substances diffuse to the dye image-receiving layer to form an image of the original subject.

Various barrier layers for these purposes are described in U.S. Pat. Nos. 3,362,819; 3,455,686; 3,415,644; 3,414,411; 3,785;815; 3,575,701; 2,584,030; 3,421,893; 3,419,389; 3,433,633; 3,856,522; 4,056,394 and 4,061,496, and Canadian Pat. No. 928,559, and British Pat. No. 1,340,349.

Development can be carried out over a wide temperature range. At temperatures considerably less than room temperature which may be encountered in cold surroundings, the development process, which is temperature-dependent, is slower and a barrier layer which breaks down or is penetrated by an alkali using a less temperature-dependent process prevents sufficient development to achieve a discernible image. On the other hand, at temperatures considerably higher than room temperature, prior art barrier layers do not allow the reduction of pH soon enough, resulting in an overdevelopment of the emulsion layers.

In an image transfer process whereby diffusible dyes are released imagewise from immobile or nondiffusible dye-releasing compounds in the areas where development of silver takes place, underdevelopment provides a washed-out, low-density image in dyes in the receiving layer. Over-development results in overly dark images of high dye density.

*Research Disclosure* 12331, Volume 123, July 1974, entitled "Neutralizing Materials in Photographic Elements", cites a variety of polymers useful in timing layers, including poly(vinyl acetate-co-maleic anhydride) lactonized and esterified to form an intramolecular ester-lactone. However, the breakdown rate of the carboxy-ester-lactone barrier layer is somewhat less affected by temperature than is the sequence of reactions of photographic development. The value of the activation energy of penetration by alkali is about 16 kcal/mole as compared to 18 to 22 kcal/mole for that of the photographic sequence of reactions. Thus, shutdown at high temperatures is not rapid enough to completely avoid overdevelopment, and shutdown at lower temperatures is not slow enough to completely avoid underdevelopment.

In U.S. Pat. No. 4,056,394, issued Nov. 1, 1977, Hannie describes a barrier layer which has improved temperature flexibility with respect to its ability to shut down development. The Hannie barrier layer comprises a polymeric latex having an activation energy of penetration by aqueous alkaline solution of greater than 18 kcal/mole. Preferred polymer latices comprise terpolymers of from 5 to 35 percent by weight of polymerized ethylenically unsaturated monomer, from about 2 to 10 percent by weight of ethylenically unsaturated carboxylic acid, and from 55 to 85 percent by weight of polymerized vinylidene chloride. This barrier layer allows the neutralizing layer to shut down development at a later time at low temperatures and earlier at high temperatures. However, at high temperatures, its dependence with respect to photographic development and dye release can, in certain instances, cause the development process to shut down too rapidly. If the terpolymer described by Hannie is dissolved in an organic solvent and coated as a single layer, rather than as a polymer latex, it would result in the development process shutting down too slowly.

In U.S. Pat. No. 4,061,496, issued Dec. 6, 1977, Hannie et al describe a barrier layer comprising two adjacent barrier layers. One of the barrier layers comprises a polymeric latex having an activation energy of penetration to aqueous alkaline solution of less than 18 kcal/mole, such as a mixture of cellulose acetate and maleic anhydride, and the second layer is a polymeric latex having an activation energy of penetration to aqueous alkaline solution of greater than 18 kcal/mole, such as poly(methylacrylate-co-itaconic acid-co-vinylidene chloride). Although the barrier layer of Hannie et al shuts down development at a rate such that development at higher and lower temperatures does not vary greatly, even better temperature latitude is desirable. Further, the addition of a latex layer can be an economic disadvantage if it is to be coated over an organic solvent-coated layer. This prior art barrier layer also involves coating two layers, as opposed to coating a single timing layer, constituting a further expense to the manufacturer.

It is thus seen that barrier layers providing improved temperature latitude which are coatable in a single layer as solutions in organic solvents are extremely desirable from an economic point of view. It is further seen that such barrier layers should also have a rate of breakdown by aqueous alkaline solutions compatible with the rates of the accompanying photographic reactions.

SUMMARY OF THE INVENTION

It has now been found that a mixture of (1) from 5 to 95 percent by weight of a copolymer comprising from 55 to 85 percent by weight of vinylidene chloride, 5 to 35 percent by weight of an ethylenically unsaturated monomer, and 0 to 20 percent by weight of an ethylenically unsaturated carboxylic acid, and (2) from 5 to 95 percent by weight of a polymeric carboxy-ester-lactone can provide a barrier layer which is a single layer, is coatable from organic solvents and can give timing layer breakdown rates in the preferred range. The composition of the layer can be adjusted to provide a range of activation energies of penetration by aqueous alkaline solutions close to that of the photographic sequence of reactions (18 to 22 kcal/mole). Using this layer, a rapid shutdown in an image transfer film unit at high temperatures avoids overdevelopment and slow shutdown at lower temperatures allows development to proceed until the desired dye densities are achieved.

A photographic element according to this invention can comprise a support, at least one silver halide layer, two or more reactants and a temporary barrier layer separating at least one reactant of the photographic element from at least one other reactant, said barrier comprising a mixture of (1) from 5 to 95 percent by weight of a copolymer comprising from 55 to 85 percent by weight of vinylidene chloride, from 5 to 35 percent by weight of an ethylenically unsaturated monomer, and 0 to 20 percent by weight of an ethylenically unsaturated carboxylic acid, and (2) from 5 to 95 percent by weight of a polymeric carboxyester-lactone.

This invention also contemplates a photographic element comprising a support, at least one silver halide emulsion layer, a dye image-receiving layer and a neutralizing layer, said element containing a temporary barrier between said neutralizing layer and said silver halide emulsion layer, said barrier comprising a mixture of (1) from 5 to 95 percent by weight of a terpolymer comprising from 55 to 85 percent by weight of vinylidene chloride, from 5 to 35 percent by weight of an ethylenically unsaturated monomer, and 0 to 20 percent by weight of an ethylenically unsaturated carboxylic acid, and (2) from 5 to 95 percent by weight of a polymeric carboxyester-lactone.

In a further embodiment of the invention, a process of producing a photographic transfer image in a photographic element comprising a support having thereon at least one photosensitive silver halide emulsion layer having associated therewith a dye image-providing material, a receiving layer, a barrier associated with a neutralizing layer being permeable by said alkaline processing composition after a predetermined time, and which is located between said photosensitive silver halide emulsion and said neutralizing layer is provided, said process comprising:
 (a) imagewise exposing said photographic element;
 (b) treating said element with alkaline processing composition in the presence of a silver halide developing agent to effect development of each of said exposed silver halide emulsion layers;
  (i) an imagewise distribution of dye image-providing material being formed as a function of development; and
  (ii) at least a portion of said imagewise distribution of said dye image-providing material diffusing to said dye image-receiving layer; and
 (c) neutralizing said alkaline processing composition by means of said neutralizing layer associated with said photographic element after said predetermined time;
the improvement wherein said barrier comprises a mixture of (1) from 5 to 95 percent by weight of a copolymer comprising 55 to 85 percent by weight of vinylidene chloride, from 5 to 35 percent by weight of an ethylenically unsaturated monomer, and 0 to 20 percent by weight of an ethylenically unsaturated carboxylic acid, and (2) from 5 to 95 percent by weight of a polymeric carboxy-ester-lactone.

In a further embodiment of the invention, a dye image-receiving element comprising a support having thereon in order: a neutralizing layer, a barrier layer and a dye image-receiving layer is provided, the improvement wherein said barrier layer comprises a mixture of (1) from 5 to 95 percent by weight of a copolymer comprising from 55 to 85 percent by weight of vinylidene chloride, from 5 to 35 percent by weight of an ethylenically unsaturated monomer, and 0 to 20 percent by weight of an ethylenically unsaturated carboxylic acid, and (2) from 5 to 95 percent by weight of a polymeric carboxy-ester-lactone.

In a still further embodiment, a cover sheet for use with color diffusion transfer assemblages comprising a transparent support having thereon in order: a neutralizing layer and a barrier layer is provided, the improvement wherein said barrier layer comprises a mixture of (1) from 5 to 95 percent by weight of a copolymer comprising from 55 to 85 percent by weight of vinylidene chloride, 5 to 35 percent by weight of an ethylenically unsaturated monomer, and 0 to 20 percent by weight of an ethylenically unsaturated carboxylic acid, and (2) from 5 to 95 percent by weight of a polymeric carboxy-ester-lactone.

DETAILED DESCRIPTION OF PREFERRED EMBODIMENTS

The novel composition comprises a mixture of (1) from 5 to 95 percent by weight of a copolymer comprising from 55 to 85 percent by weight of vinylidene chloride, 5 to 35 percent by weight of an ethylenically unsaturated monomer and 0 to 20 percent by weight of an ethylenically unsaturated carboxylic acid, and (2) from 5 to 95 percent by weight of a polymeric carboxy-ester-lactone.

Any ethylenically unsaturated monomer which is different from the other monomers in the polymeric latex can be used to prepare the copolymer, including alkyl acrylates and methacrylates, such as methyl acrylate, ethyl acrylate, propyl acrylate, butyl acrylate, butyl methacrylate and the like; vinyl esters, amides, nitriles, ketones, halides, ethers, olefins, diolefins and the like are exemplified by acrylonitrile, methacrylonitrile, styrene-α-methyl styrene, acrylamide, methacrylamide, vinyl chloride, methyl vinyl ketone, fumaric maleic and itaconic esters, 2-chloroethylvinyl ether, dimethylaminoethyl methacrylate, 2-hydroxyethyl methacrylate, N-vinylsuccinamide, N-vinylphthalamide, N-vinylpyrrolidine, butadiene, ethylene and the like. Preferred monomers are methyl acrylate and acrylonitrile.

Examples of ethylenically unsaturated carboxylic acids which can be included in the polymer include acrylic acid, methacrylic acid, itaconic acid, fumaric acid, maleic acid, their anhydrides, acid chlorides and the like. The preferred carboxylic acids are acrylic acid and itaconic acid.

A preferred composition of the copolymer comprises 55 to 85 percent by weight of vinylidene chloride, 5 to 35 percent by weight of acrylonitrile, and 2 to 10 percent by weight of acrylic acid. A most preferred weight ratio for the copolymer, poly(acrylonitrile-co-vinylidene chloride-co-acrylic acid) is 14/80/6.

A vinylidene chloride copolymer latex comprising about 80 percent vinylidene chloride, 15 percent acrylonitrile and 5 percent acrylic acid can be prepared essentially as described in U.S. Pat. No. 2,627,088. A reactor is charged with 4.5 g of potassium persulfate dissolved in water, stirring, cooling to 20° C., and purging with nitrogen and adding 257 g of acrylonitrile, 1,453 g of vinylidene chloride and 90 g of acrylic acid. To this is added a solution of 2.25 g of potassium peroxy disulfate or a persulfate in water and the reaction is continued at 30° C. in 150 revolutions per minute stirring.

The above-described copolymer latex can be converted to the solid copolymer by the following procedure: 2 parts (by volume) of the latex, containing 33 percent solids, is charged into a reactor with 3 parts (by volume) of an organic solvent, such as methanol. The mixture is stirred with heating and then cooled. The copolymer is allowed to settle and the supernatant fluid is siphoned off. The process is repeated a second time with 1 part solvent and a third time with no heating. The polymer is then stirred with 2 parts distilled water, centrifuged and dried.

As noted above, the novel composition also comprises 95 to 5 percent by weight of a polymeric carboxy-ester-lactone. The polymeric carboxy-ester-lactone is prepared by lactonizing and esterifying a copolymer of (a) an unsaturated α,β-dicarboxylic acid or anhydride, and (b) a vinyl organic acid ester.

Typical unsaturated α,β-dicarboxylic acids or their anhydrides include maleic acid, itaconic acid, citraconic acid, dimethylmaleic acid or anhydrides or alkyl esters having 1 to 4 carbons thereof, fumaric acid, mesaconic acid, dimethylfumaric or alkyl esters having 1 to 4 carbon atoms thereof and the like. The preferred unsaturated α,β-dicarboxylic acid or anhydride is maleic anhydride.

Typical vinyl organic esters include vinyl acetate, vinyl propionate, vinyl butyrate, vinyl benzoate and the like. The preferred vinyl organic ester is vinyl acetate.

The copolymers described above can be lactonized and esterified to form the polymeric carboxy-ester-lactone of the invention. Examples of useful polymers include poly(vinyl acetate-co-maleic anhydride), poly(vinyl acetate-co-itaconic anhydride), poly(vinyl propionate-co-maleic anhydride) and the like. The preferred copolymer is poly(vinyl acetate-co-maleic anhydride).

A copolymer of maleic anhydride and vinyl acetate having the repeating units:

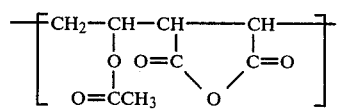

is the preferred copolymer.

The above-described copolymers can be prepared by copolymerizing the above-identified α,β-dicarboxylic acids or their anhydrides with the above-identified vinyl organic acid esters as follows: a mixture (preferably equimolar) of an unsaturated α,β-dicarboxylic acid or anhydride, such as maleic anhydride, and a vinyl organic acid ester, such as vinyl acetate, in an organic solvent such as dichloroethane are placed in a tank attached to a reactor. The reactor is charged with solvent, and both the tank and the reactor are degassed with nitrogen. The reactor is heated and a small amount of initiator such as 2,2'-azobis(2-methylpropionitrile) is added. The contents of the tank is pumped slowly into the reactor with stirring. After the addition is complete, the mixture is stirred and heated under nitrogen. The reactor is then cooled and the precipitate is filtered off, washed with solvent and air dried.

The polymeric carboxy-ester-lactone of the present invention can be prepared by lactonization and esterification of the above-described copolymers. The above-described copolymers can be reacted with a monohydric alcohol ROH or a mixture of an aliphatic monohydric hydroxy acid and a monohydric alcohol of the formulas:

where n represents an integer of from 1 to 5, x is 1 or 2, and R represents an alkyl group having from 1 to 12 carbon atoms, such as methyl, ethyl, propyl, isopropyl, butyl, hexyl, decyl, dodecyl and the like, or an aralkyl group wherein the alkyl group comprises from 1 to 4 carbon atoms, such as benzyl, phenylethyl, phenylpropyl, phenylbutyl, tolylbutyl and the like. It is noted that R can be additionally substituted with substituents that do not interfere with the esterification-lactonization reaction or the desired properties of the resulting polymeric carboxy-ester-lactone. Examples of such substituents include halogen substituents such as chloroethanol, amino substituents such as dimethylamino ethanol and the like. During the reaction, the copolymer is deacetylated, the anhydride is opened, the lactone ring is formed, and then esterified with the alcohol or the hydroxy acid and alcohol to form an alkyl ester or a mixed alkyl ester and a carboxy ester.

The polymeric carboxy-ester-lactone can comprise the following recurring structural units:

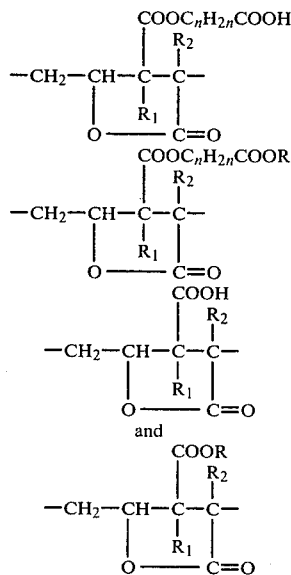

where n and R are as previously described, and $R_1$ and $R_2$ represent, individually, a hydrogen atom or a methyl group.

The exact proportions of structural units (1), (2), (3) and (4) of the polymeric carboxy-ester-lactone are not accurately shown, but considerable variation is possible, depending on the relative amounts of monohydric alcohol or monohydric hydroxy acid and monohydric alcohol used. It should be noted that, where only the monohydric alcohol is used, the polymeric carboxy-ester-lactone comprises both structural units (3) and (4). If the alcohol and hydroxy acid are both used, then the lactone comprises all of units (1), (2), (3) and (4). It is noted that if the hydroxy acid alone is used, only unit (1) is obtained.

Although the exact proportions of the units can vary, at least units (3) and (4) must be present. The lactone can comprise from about 1 to about 99 percent by weight of unit (3) or a combination of (3) and (1), and from about 1 to 99 percent by weight of unit (4) or a combination of (4) and (2). Preferably, structure (3) or (3) and (1) comprise from about 15 to about 35 percent by weight of the recurring units, and structure (4) or (4) and (2) comprise from about 65 to about 85 percent by weight of the recurring units.

Suitable monohydric hydroxy acids include glycolic acid, lactic acid, hydroxybutyric acid, hydroxyvaleric acid, hydroxycaproic acid, maleic acid and the like. The preferred monohydric hydroxy acid is glycolic acid.

Suitable monohydric alcohols include methanol, ethanol, propanol, isopropanol, n-butanol, n-hexanol, 2-ethyl-1-hexanol, decanol, dodecanol, and the like. The preferred monohydric alcohol is n-butanol.

The preferred polymeric carboxy-ester-lactone substantially comprises the following recurring structural units:

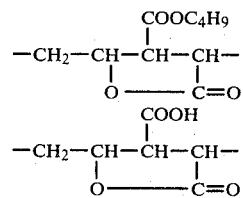

Lactonization and esterification of the described copolymers to produce the polymeric carboxy-ester-lactone of the invention can be accomplished by heating the copolymer, such as poly(vinyl acetate-co-maleic anhydride) to reaction temperature, typically 60° to 100° C., and stirring with a monohydric alcohol, such as n-butanol, or a mixture of a monohydric hydroxy acid and a monohydric alcohol, such as glycolic acid and n-butanol, in an organic solvent such as dioxane. (Alternatively, the reaction may be carried out in partially aqueous medium. This is particularly desirable, though not necessary when treating an anhydride copolymer.) The suspension is stirred until a smooth dope is obtained. To this is added a lesser amount of mineral acid catalyst, such as sulfuric acid or hydrochloric acid. The mixture is stirred and heated for 2 to 24 hours and then cooled. The dope is diluted with an organic solvent, such as acetone, to precipitation viscosity. The dope is poured into distilled water to obtain a soft and partially fibrous product. The polymer is stirred with repeated changes of distilled water, until free from mineral acid. The hardened polymer is filtered off and vacuum or air dried.

A titrimetry procedure was utilized to determine the amount of acid, both organic and inorganic, in the polymers. The samples were dissolved in an acetone/water mixture (80/20) and titrated with hexadecyltrimethylammonium hydroxide (0.1 normal in benzene/methanol—90/10), using a Metrohm Potentiograph E-436 automatic titrator.

The carboxyl content, which is a measure of the relative acid versus ester composition of the final polymer, can be modified by adjusting the relative amounts of alcohol and water used in the lactonization and esterification procedure. The carboxy-ester-lactone preferably has from about 0.25 to about 5.0 millequivalents of acid per gram of polymer.

The mixture of the novel composition can be prepared by dissolving the dried vinylidene chloride copolymer in an organic solvent, such as methylethylketone and adjusting the solution to the desired concentration, such as 5 to 15 percent by weight. The polymeric carboxy-ester-lactone is also dissolved in an organic solvent. Homogeneous mixtures of the polymers of varying ratios can be made simply by combining different volumes of solutions of known concentration. A most preferred composition comprises a mixture of (1) 60 percent by weight of poly(acrylonitrile-co-vinylidene chloride-co-acrylic acid) having a weight ratio of 14/80/6, and (2) 40 percent by weight of a polymeric carboxy-ester-lactone produced by lactonizing and esterifying poly(vinyl acetate-co-maleic anhydride) (1:1) with n-butyl alcohol, and having 0.25 to 5.0 milliequivalents acid per gram of copolymer, said mixture being dissolved in an organic solvent, such as methylethylketone. The resulting polymer solutions can be coated as barrier layers by conventional solvent coating procedures, such as roll coating, brush coating, etc.

The preferred coverage of coatings for these solvent-coated barrier layers ranges from about 0.5 to about 10, and preferably from about 2 to 6 g/m$^2$.

A photographic element according to this invention can comprise a support, at least one silver halide layer, two or more reactants and a temporary barrier layer separating at least one reactant of the photographic element from at least one other reactant, said barrier layer comprising a mixture of (1) from 5 to 95 percent by weight of a copolymer comprising from 55 to 85 percent by weight of vinylidene chloride, from 5 to 35 percent by weight of an ethylenically unsaturated monomer, and 0 to 20 percent by weight of an ethylenically unsaturated carboxylic acid, and (2) from 5 to 95 percent by weight of a polymeric carboxy-ester-lactone.

Various reactants which can be separated by this technique include acids and bases, developing agents and development restrainers, bleaching agents and metallic silver, silver halide and silver halide solvents and the like.

A photographic film unit according to this invention can comprise (a) a support having thereon at least one photosensitive silver halide emulsion layer preferably having associated therewith a dye image-providing material; (b) an image-receiving layer; (c) alkaline processing composition and means for discharging same within the assemblage; (d) a neutralizing layer for neutralizing said alkaline processing composition; and (e) a barrier layer positioned between the neutralizing layer and said photosensitive silver halide emulsion layer and dye image-providing material, the film unit containing a silver halide developing agent, and wherein said barrier layer comprises a mixture of (1) from 5 to 95 percent by weight of a copolymer comprising from 55 to 85 percent by weight of vinylidene chloride, 5 to 35 percent by weight of an ethylenically unsaturated monomer, and 0 to 20 percent by weight of an ethylenically unsaturated carboxylic acid, and (2) from 5 to 95 percent by weight of a polymeric carboxy-ester-lactone.

In one embodiment according to this invention, the film units are integral negative-receiver color diffusion transfer film units in which the barrier layer of the invention can be employed on a cover sheet as disclosed in Canadian Pat. No. 928,559. In this embodiment, the support for the photosensitive element is transparent and is coated with the image-receiving layer, an opaque light-reflective layer, a black opaque layer and photosensitive layers having associated therewith dye image-providing materials. A rupturable container containing an alkaline processing composition and an opacifier, such as carbon black, is positioned adjacent the top layer and a transparent cover sheet. The cover sheet comprises a transparent suppport which is coated with a neutralizing layer and the barrier layer of this invention. The film unit is placed in a camera, exposed through the transparent cover sheet and then passed through a pair of pressure-applying members in the camera as it is being removed therefrom. The pressure-applying members rupture the container and spread processing composition and opacifier over the image-forming portion of the film unit. The silver halide layers are developed and dye images are formed as a function of development. The dyes diffuse to the image-receiving layer to provide an image which is viewed through the transparent support on the opaque reflecting layer background. The barrier layer breaks down after a period of time and makes available materials to neutralize the alkaline processing composition and to shut down further silver halide development. For further details concerning the format of this particular integral film unit, reference is made to the above-mentioned Canadian Pat. No. 928,559, which is incorporated herein by reference.

Another embodiment of a film unit of an integral color diffusion transfer film unit in which the barrier layer of the invention can be employed in a dye image-receiving element is described in U.S. Pat. No. 3,415,644. In this embodiment, the photosensitive element comprises an opaque support which is coated with photosensitive layers having associated therewith dye image-providing material. A rupturable container containing an alkaline processing composition, TiO$_2$ and an indicator dye (see U.S. Pat. No. 3,647,437) is positioned adjacent the top layer and a transparent receiver. The receiver comprises a transparent support which is coated with a neutralizing layer, a barrier layer and an image-receiving layer. The film unit is placed in a camera, exposed through the transparent receiver and then passed through a pair of pressure-applying members in the camera as it is being removed therefrom. The pressure-applying members rupture the container and spread processing composition, TiO$_2$ and indicator dye over the image-forming portion of the film unit to protect it from exposure. The processing composition develops each silver halide layer and an imagewise distribution of diffusible dye remains in areas which are not developed, and said dye diffuses to the image-receiving layer where it can be viewed through the transparent support on a white background, the indicator dye having "shifted" to a colorless form as the alkali is consumed by the neutralizing layer. As before, the neutralizing layer then neutralizes the alkaline processing composition after the barrier layer of the invention breaks down. For further details concerning the format of this particular film unit, reference is made to the above-mentioned U.S. Pat. No. 3,415,644, which is incorporated herein by reference.

Another embodiment of a color diffusion transfer system in which the barrier layer of the invention can be employed in a dye image-receiving element is described in U.S. Pat. No. 3,362,819. The image-receiving element comprises a support, which is ususally opaque, having thereon a neutralizing layer, the barrier layer of this invention and a dye image-receiving layer. For further details concerning the use of such an element in color transfer film units, reference is made to the above-mentioned U.S. Pat. No. 3,362,819, which is incorporated herein by reference.

Still other useful integral formats in which this invention can be employed are described in U.S. Pat. Nos. 3,415,645; 3,415,646; 3,647,437; 3,635,707; and 3,594,165, and British Pat. No. 1,330,524.

The photosensitive element useful in this invention can be treated with an alkaline processing composition to effect or initiate development in any manner. A preferred method for applying processing composition is by use of a rupturable container or pod which contains the composition. In general, the processing composition employed in this invention contains the developing agents for development, although the composition could also be just an alkaline solution where the developer is incorporated in the photosensitive element. In such case, the alkaline solution serves to activate the incorporated developer.

The dye image-providing materials may be employed in this invention generally may be characterized as either (1) initially soluble or diffusible in the processing composition but selectively rendered nondiffusible in an imagewise pattern as a function of development, such as those disclosed, for example, in U.S. Pat. Nos. 2,647,049; 2,661,293; 2,698,244; 2,698,798; 2,802,735; 2,774,668 and 2,983,606, or (2) initially insoluble or nondiffusible in the processing composition but providing a diffusible image dye-providing material as a function of development, such as those disclosed, for example, in U.S. Pat. Nos. 3,227,550, 3,227,551, 3,227,552, 3,227,554, 3,243,294 and 3,445,228. These materials may contain preformed dyes or dye precursors, e.g. color couplers, oxichromic compounds and the like.

In a preferred embodiment of this invention, the dye image-providing material is a ballasted redox dye releaser. Such compounds are, generally speaking, compounds which can be oxidized, i.e., crossoxidized, by an oxidized developing agent to provide a species which as a function of oxidation will release a diffusible dye, such as by alkaline hydrolysis. Such redox dye releasers are described in U.S. Pat. Nos. 3,725,062 of Anderson and Lum issued Apr. 3, 1973, 3,698,897 of Gompf and Lum issued Oct. 17, 1972, 3,628,952 of Puschel et al issued Dec. 21, 1971 and 3,443,939 of Bloom et al. and 3,443,940 of Bloom et al, both issued May 13, 1969, 4,076,529 of Fleckenstein et al issued Feb. 28, 1978 and 3,928,312 of Fleckenstein issued Dec. 23, 1975, 3,942,987 and 3,932,381 of Landholm et al, 3,931,144 of Haase et al, 4,053,312, 4,055,428, 3,728,113, German Pat. Nos. 2,505,248 and 2,729,820 and Research Disclosure Nos. 15157 (November, 1976) and 15654 (April, 1977). Positive working systems include U.S. Pat. No. 3,980,479, U.S. Application Ser. No. 775,025, filed Mar. 7, 1977 and U.K. Pat. No. 1,464,104.

The term "nondiffusible" as used throughout the specification is intended to mean that the material will not substantially diffuse either within or from the layer in which it is located within the photographic element during contact in an alkaline solution at a pH, for example, of greater than 11. In most cases, the material is ballasted so as to render it nondiffusible. Likewise, the term "diffusible" is intended to mean that the material when in contact with alkaline solution under conditions similar to those described above will substantially migrate from its layer in the photographic element to the image-receiving layer where it is mordanted.

In one preferred embodiment of this invention, the redox dye releasers in the Fleckenstein et al U.S. Pat. No. 4,076,529 issued Feb. 28, 1978, referred to above are employed. Such compounds are nondiffusible sulfonamido compounds which are alkali-cleavable upon oxidation to release a diffusible sulfonamido dye. In certain preferred embodiments, the compounds have the formula:

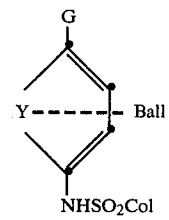

wherein:

Ball represents an organic ballasting group (preferably containing at least 8 carbon atoms) which renders said compound nondiffusible in a photographic element during processing of said element with an alkaline composition;

Y represents the atoms necessary to complete a benzene, naphthalene or heterocyclic nucleus;

G is OR or $NHR_1$ wherein R is hydrogen or a hydrolyzable moiety and $R_1$ is hydrogen or a substituted or unsubstituted alkyl group of 1 to 22 carbon atoms, such as methyl, ethyl hydroxyethyl, propyl, butyl secondary butyl, tert-butyl, cyclopropyl, 4-chlorobutyl, cyclobutyl, 4-nitroamyl, hexyl, cyclohexyl, octyl, decyl, octadecyl, docosyl, benzyl, phenethyl, etc. (when $R_1$ is an alkyl group of greater than 6 carbon atoms, it can serve as a partial or sole Ballast group); and Col is a dye or dye precursor moiety.

For further details concerning the above-described sulfonamido compounds and specific examples of same, reference is made to the above-mentioned Fleckenstein et al. U.S. Pat. No. 4,076,529 and Belgian Pat. No. 799,268 issued Feb. 28, 1973, the disclosures of which are hereby incorporated by reference.

Sulfonamido compounds which can be employed in this invention include the following:

Compound No. 1

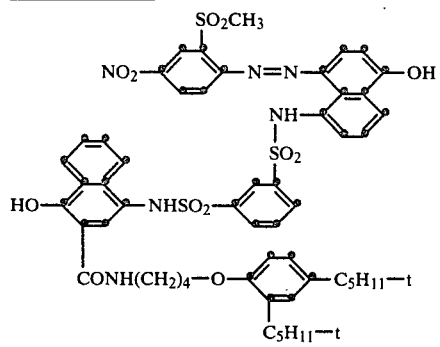

Compound No. 2

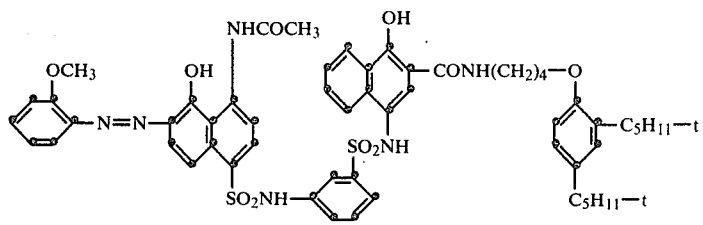

Compound No. 3

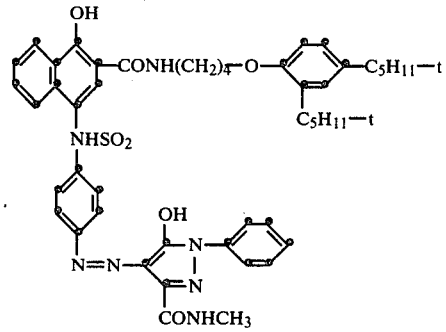

Compound No. 4

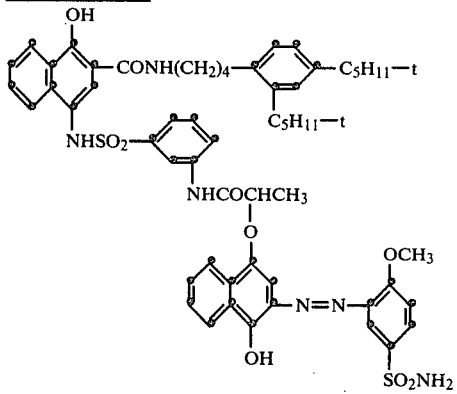

Compound No. 5

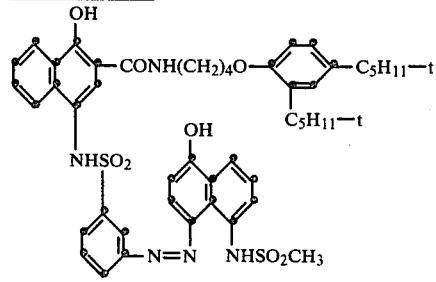

In another preferred embodiment of this invention, initially diffusible dye image-providing materials are employed such as dye developers, including metal-complexed dye developers such as those described in U.S. Pat. Nos. 3,482,972, 3,453,107, 3,544,545, 3,551,406, 3,563,739, 3,597,200 and 3,705,184, and oxichromic developers as described and claimed in U.S. Pat. No. 3,880,658 by my coworkers Lestina and Bush issued Apr. 29, 1975, the disclosures of which are hereby incorporated by reference. When oxichromic developers are employed, the image is formed by the diffusion of the oxichromic developer to the dye image-receiving layer where it undergoes chromogenic oxidation to form an image dye.

The film unit of the present invention may be used to produce positive images in single- or multicolors, as well as in black and white. In a three-color system, each silver halide emulsion layer of the film assembly will have associated therewith a dye image-providing material capable of providing a dye having a predominant spectral absorption within the region of the visible spectrum to which said silver halide emulsion is sensitive, i.e. the blue-sensitive silver halide emulsion layer will have a yellow dye image-providing material associated therewith, the green-sensitive silver halide emulsion layer will have a magenta dye image-providing material associated therewith, and the red-sensitive silver halide emulsion layer will have a cyan dye image-providing material associated therewith. The dye image-providing material associated with each silver halide emulsion layer may be contained either in the silver halide emulsion layer itself or in a layer contiguous to the silver halide emulsion layer.

The concentration of the dye image-providing materials that are employed in the present invention may be varied over a wide range depending upon the particular compound employed and the results which are desired. For example, the dye image-providing compounds may be coated as dispersions in layers by using coating compositions containing a weight ratio between about 0.25 and about 4 of the dye image-providing compound to the hydrophilic film-forming natural material or synthetic polymer binder, such as gelatin, polyvinyl alcohol, etc., which is adapted to be permeated by aqueous alkaline processing composition.

Generally, most silver halide developing agents can be employed to develop the silver halide emulsions in the photographic elements of this invention. The developer may be employed in the photosensitive element to be activated by the alkaline processing composition.

Specific examples of developers which can be employed in this invention include:
hydroquinone
N-methylaminophenol
Phenidone(1-phenyl-3-pyrazolidinone)
Dimezone(1-phenyl-4,4-dimethyl-3-pyrazolidinone)
aminophenols
N-N-diethyl p-phenylenediamine
3-methyl-N,N-diethyl-p-phenylenediamine
N,N,N',N'-tetramethyl-p-phenylenediamine
4-hydroxymethyl-4-methyl-1-phenyl-3-pyrazolidinone, etc.

In using redox dye releaser compounds in this invention, diffusible dye images are produced as a function of development of the silver halide emulsions. If the silver halide emulsion employed forms a direct-positive silver image, such as a direct-reversal internal-image emulsion or a solarizing emulsion, which is developable in unexposed areas, a positive image can be obtained on the dye image-receiving layer when redox releasers are employed which release dye where oxidized. After exposure of the film unit, the alkaline processing composition permeates the various layers to initiate development in the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the redox dye releaser compound, the oxidized form of which either releases directly or undergoes a base-catalyzed reaction to release the preformed dyes or the dye precursors imagewise as a function of the imagewise exposure of each of the silver halide emulsion layers. At least a portion of the imagewise distributions of diffusible dyes or dye precursors diffuses to the image-receiving layer to form a positive image of the original subject.

Internal-image silver halide emulsions useful in the above-described embodiment are direct-positive emulsions that form latent images predominantly inside the silver halide grains, as distinguished from silver halide grains that form latent images predominantly on the surface thereof. Such internal-image emulsions were described by Davey et al in U.S. Pat. No. 2,592,250 issued Apr. 8, 1952, and elsewhere in the literature. Other useful emulsions are described in U.S. Pat. Nos. 3,761,276, 3,761,266 and 3,761,267, all issued Sept. 25, 1973. Internal-image silver halide emulsions can be defined in terms of the increased maximum density obtained when developed to a negative silver image with "internal-type" developers over that obtained when developed with "surface-type" developers. Suitable internal-image emulsions are those which, when measured according to normal photographic techniques by coating a test portion of the silver halide emulsion on a transparent support, exposing to a light-intensity scale having a fixed time between 0.01 and 1 second, and developing for 3 minutes at 20° C. in Developer A below ("internal-type" developer), have a maximum density at least 5 times the maximum density obtained when an equally exposed silver halide emulsion is developed for 4 minutes at 20° C. in Developer B described below ("surface-type" developer). Preferably, the maximum density in Developer A is at least 0.5 density unit greater than the maximum density in Developer B.

| Developer A | |
|---|---|
| hydroquinone | 15 g |
| monomethyl-p-aminophenol sulfate | 15 g |
| sodium sulfite (desiccated) | 50 g |
| potassium bromide | 10 g |
| sodium hydroxide | 25 g |
| sodium thiosulfate | 20 g |
| water to make one liter | |
| Developer B | |
| p-hydroxyphenylglycine | 10 g |
| sodium carbonate | 100 g |
| water to make one liter | |

The internal-image silver halide emulsions when processed in the presence of fogging or nucleating agents provide direct-positive silver images. Such emulsions are particularly useful in the above-described embodiment. Suitable fogging agents include the hydrazines disclosed by Ives, U.S. Pat. Nos. 2,588,982 issued Mar. 11, 1952 and 2,563,785 issued Aug. 7, 1951; the hydrazides and hydrazones disclosed by Whitmore, U.S. Pat. No. 3,227,552 issued Jan. 4, 1966; hydrazone quaternary salts described in British Pat. No. 1,283,835 and U.S. Pat. No. 3,615,615; hydrazone-containing polymethine dyes described in U.S. Pat. No. 3,718,470; and the fogging agents disclosed in U.S. Pat. Nos. 4,030,925 and 4,031,127 both of Leone et al or mixtures thereof. The quantity of fogging agent employed can be widely varied depending upon the results desired. Generally, the concentration of fogging agent is from about 0.4 to about 8 g per mole of silver in the photosensitive layer in the photosensitive element or from about 0.1 to about 2 g per liter of developer if it is located in the developer. The fogging agents described in U.S. Pat. Nos. 3,615,615 and 3,718,470, however, are preferably used in concentrations of 50 to 400 mg per mole of silver in the photosensitive layer.

Typical useful direct-positive emulsions are disclosed in U.S. Pat. Nos. 3,227,552 by Whitmore issued Jan. 4, 1966, 3,761,276 by Evans issued Sept. 25, 1973, 3,923,513 by Evans issued Dec. 2, 1975, 3,761,267 by Gilman et al, 3,761,266 by Milton, 3,703,584 by Motter, and the like.

In other embodiments, the direct-positive emulsions can be emulsions which have been fogged either chemically or by radiation on the surface of the silver halide grains to provide for development to maximum density without exposure. Upon exposure, the exposed areas do not develop, thus providing for image discrimination and a positive image. Silver halide emulsions of this type are very well-known in the art and are disclosed, for example, in U.S. Pat. Nos. 3,367,778 by Berriman issued Feb. 6, 1968, and 3,501,305, 3,501,306 and 3,501,307 by Illingsworth, all issued Mar. 17, 1970.

In still other embodiments, the direct-positive emulsions can be of the type described by Mees and James, "The Theory of the Photographic Process," published by MacMillan Company, New York, N.Y., 1966, pp. 149-167.

The various silver halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in this invention can be of the type disclosed in U.S. Pat. Nos. 2,543,181, 2,643,886, 2,653,732, 2,734,051, 3,056,492, 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color photographic film unit according to this invention, each silver halide emulsion layer containing a dye image-providing material or having the dye image-providing material present in a contiguous layer may be separated from the other silver halide emulsion layers in the negative portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104, 3,043,692, 3,044,873, 3,061,428, 3,069,263, 3,069,264, 3,121,011 and 3,427,158.

Generally speaking, except where noted otherwise, the silver halide emulsion layers in the invention comprise photosensitive silver halide dispersed in gelatin and are about 0.25 to 5 microns in thickness; the dye image-providing materials are dispersed in an aqueous alkaline solution-permeable polymeric binder, such as gelatin, as a separate layer about 0.25 to 5 microns in thickness; and the alkaline solution-permeable polymeric interlayers, e.g., gelatin, are about 0.25 to 5 microns in thickness. Of course, these thicknesses are approximate only and can be modified according to the product desired.

The alkaline solution-permeable, light-reflective layer employed in certain embodiments of photographic film units of this invention can generally comprise any opacifier dispersed in a binder as long as it has the desired properties. Particularly desirable are white light-reflective layers, since they would be aesthetically pleasing backgrounds on which to view a transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix, such as, for example gelatin, polyvinyl alcohol, and the like. Brightening agents such as the stilbenes, coumarines, triazines and oxazoles can also be added to the light-reflective layer, if desired. When it is desired to increase the opacifying capacity of the light-reflective layers, dark-colored opacifying agents, e.g., pH-indicator dyes may be added to it, or carbon black, nigrosine dyes, etc., may be coated in a separate layer adjacent the light-reflective layer.

The neutralizing layer employed in this invention, which becomes operative after permeation of the processing composition through the barrier layers, will effect a reduction in the pH of the image layers from about 13 or 14 to at least 11 and preferably 5 to 8 within a short time after imbibition. For example, polymeric acids as disclosed in U.S. Pat. No. 3,362,819 or solid acids or metallic salts, e.g. zinc acetate, zinc sulfate, magnesium acetate, etc., as disclosed in U.S. Pat. No. 2,584,030 may be employed with good results. Such neutralizing or pH-lowering materials reduce the pH of the film unit after development to terminate development and substantially reduce further dye transfer and thus stabilize the dye image.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described by Minsk, U.S. Pat. No. 2,882,156 issued Apr. 14, 1959, and basic polymeric mordants such as described in U.S. Pat. Nos. 3,709,690, 3,625,694, 3,898,088 by Cohen et al issued Aug. 5, 1975, and 3,859,096 by Burness et al issued Jan. 7, 1975. Other mordants useful in this invention include poly-4-vinylpyridine, the 2-vinyl pyridine polymer metho-p-toluene sulfonate and similar compounds described by Sprague et al, U.S. Pat. No. 2,484,430 issued Oct. 11, 1949, and cetyl trimethylammonium bromide, etc. Effective mordanting compositions are also described in U.S. Pat. Nos. 3,271,148 by Whitmore and 3,271,147 by Bush, both issued Sept. 6, 1966, and in 3,958,995 issued May 25, 1976.

Other materials useful in the dye image-receiving layer include alkaline solution-permeable polymers such as N-methoxymethyl polyhexylmethylene adipamide, partially hydrolyzed polyvinyl acetate and other materials of a similar nature. Generally, good results are obtained when the image-receiving layer, preferably alkaline solution-permeable, is transparent and about 0.25 to about 5$\mu$ in thickness. This thickness, of course, can be modified depending upon the result desired. The image-receiving layer can also contain ultraviolet absorbing materials, to protect the mordanted dye images from fading due to ultraviolet light, and brightening agents such as the stilbenes, coumarins, triazines, oxazoles, dye stabilizers such as the chromanols, alkylphenols, etc.

The alkaline processing composition employed in this invention is the conventional aqueous solution of an alkaline material, e.g. sodium hydroxide, sodium carbonate or an amine such as diethylamine, preferably processing a pH in excess of 11, and preferably containing a developing agent as described previously. The solution also preferably contains a viscosity-increasing compound such as a high-molecular-weight polymer, e.g., a water-soluble ether inert to alkaline solution such as hydroxyethyl cellulose or alkali metal salts of carboxymethyl cellulose such as sodium carboxymethyl cellulose. A concentration of viscosity-increasing compound of about 1 to about 5 percent by weight of the processing composition is preferred which will impart thereto a viscosity of about 100 cps to about 200,000 cps. In certain embodiments of this invention, an opacifying agent, e.g. $TiO_2$, carbon black, indicator dyes, etc., may be added to the processing composition. In addition, ballasted indicator dyes and dye precursors may also be present in the photographic film unit as a separate layer on the exposure side of the photosensitive layers, the indicator dyes being preferably transparent during exposure and becoming colored or opaque after contact with alkali from the processing composition.

The support for the photographic elements of this invention can be any material as long as it does not deleteriously effect the photographic properties of the film unit and is dimensionally stable. Typical flexible sheet materials include cellulose nitrate film, cellulose acetate film, poly(vinyl acetal) film, polystyrene, film, poly(ethylene-terephthalate) film, polycarbonate film, poly-α-olefins such as polyethylene and polypropylene film, and related films or resinous materials. The support is usually about 2 to 9 mils (50–225 μm) in thickness. Ultraviolet-absorbing materials may also be included in the supports or as a separate layer on the supports if desired.

The silver halide emulsions useful in this invention are well-known to those skilled in the art and are described in "Product Licensing Index," Volume 92, December, 1971, publication 9232, p. 107, paragraph I, "Emulsion types." They may be chemically and spectrally sensitized as described on p. 107, paragraph III, "Chemical sensitization," and pp. 108–109, paragraph XV, "Spectral sensitization," of the above article; they can be protected against the production of fog and can be stabilized against loss of sensitivity during keeping by employing the materials described on p. 107, paragraph V, "Antifoggants and Stabilizers," of the above article; they can contain development modifiers, hardeners, and coating aids as described on pp. 107–108, paragraph IV, "Development modifiers"; paragraph VII, "Hardeners"; and paragraph XII, "Coating aids," of the above article; they and other layers in the photographic elements used in this invention can contain plasticizers, vehicles and filter dyes described on p. 108, paragraph XI, "Plasticizers and lubricants," and paragraph VIII, "Vehicles," and p. 109, paragraph XVI, "Absorbing and filter dyes," of the above article; they and other layers in the photographic elements used in this invention may contain addenda which are incorporated by using the procedures described on p. 109, paragraph XVII, "Methods of addition," of the above article; and they can be coated using the various techniques described on p. 109, paragraph XVIII, "Coating procedures," of the above article; the disclosures of which are hereby incorporated by reference.

The barrier layers of the invention can contain addenda such as developer inhibitor precursors or competing developer precursors, which are leased only as the layer breaks down. These precursors are hydrophobic derivatives which are organic solvent soluble and are readily incorporated into the solvent coated barrier layer. Use of such compounds in barrier layers are described in U.S. Pat. No. 4,009,029.

The following preparations and examples further illustrate the invention.

Preparation 1

Preparation of Carboxy-ester-lactone Polymer

Poly(vinyl acetate-co-maleic anhydride) was prepared by copolymerizing vinyl acetate and maleic anhydride as follows: to 4,909 g of dichloroethane was added with stirring 1,961 g of maleic anhydride and 1,721 g of vinyl acetate. A small amount of material remained undissolved. The solution was filtered and placed in a header tank attached to a Pfaudler five-gallon reactor. The reactor was charged with 9,818 g of dichloroethane and both the header tank and the reactor were degassed with nitrogen for 20 minutes. The reactor was then heated to 60° C. and 36.8 g of 2,2'-azobis(2-methylpropionitrile) was added and rinsed with 50 ml of acetone. The contents of the header tank were pumped into the reactor for a period of 3 hours with stirring. After 20 minutes, a white precipitate began forming in the reactor. After 1 hour, a one-degree exotherm was indicated on the recorder chart and was constant during the remainder of the addition. After the addition was complete, the mixture was stirred for 16 hours at 80° C. under nitrogen. The reactor was then cooled to 20° C. and the mixture filtered and washed with 2 liters of dichloroethane. The finely divided white solid was dried at 40° C. under vacuum to give 3,600 g of copolymer with an inherent viscosity $N_{acetone}$ equal to 0.34.

Preparation 2

Lactonization and esterification of poly(vinyl acetate-co-maleic anhydride) was as follows: a five-gallon Pfaudler reactor was charged with 10,712 ml of butyl alcohol, 1,040 g of water, 455 ml of concentrated sulfuric acid, and 1,300 g of poly(vinyl acetate-co-maleic anhydride) (1:1). The reactor was heated to 95° C. and the contents stirred at 95° C. for 24 hours. The reactor was then cooled to 25° C. and a liquor was drawn off, leaving a soft, taffy-like solid. This solid was redissolved in 2 gallons of acetone with stirring overnight. The polymer was then precipitated in 30 gallons of tap water and washed three times. The solid was filtered and dried at 50° C. under vacuum, giving 1,190 g of polymer containing 1.05 milliequivalents of acid per gram of polymer.

Preparation 3

A further example of lactonization and esterification of poly(vinyl acetate-co-maleic anhydride) was as follows: in a five-liter flask with a reflux condenser and stirrer were placed 1,390 ml of dioxane, 940 ml of 70 percent glycolic acid, 450 ml of n-butyl alcohol and 300 g of poly(vinyl acetate-co-maleic anhydride). The suspension was stirred until a smooth brown dope was obtained. To this was added 108 ml of concentrated sulfuric acid dropwise. The slightly lighter-colored dope was stirred and heated on a steam bath overnight, at the end of which time it was cooled and diluted with acetone to precipitation viscosity. The light amber colored dope was poured into distilled water with stirring to obtain a soft and partially fibrous product. The polymer was stirred, with repeated changes of distilled water, until free from mineral acid. During the time, it hardened and broke apart readily. It was dried in an air oven at room temperature to give 240 g of a cream-colored product. Direct titration in 1:1 acetone:water (200 ml/g) with N/2 sodium hydroxide to a phenolphthalein endpoint indicated a carboxyl content of 4.84 milliequivalents per gram of polymer.

EXAMPLE 1

(a) A vinylidene chloride copolymer latex which comprised about 75 percent vinylidene chloride, 18 percent acrylonitrile and 7 percent acrylic acid was prepared essentially as described in Nadeau U.S. Pat. No. 2,943,937 and Alles and Saner U.S. Pat. No. 2,627,088.

(b) The latex (2 parts by volume) which contained 33 percent solids was charged into a reactor, heated to 30° C., diluted with 3 parts by volume methanol with stirring, further heated to 55° C., and then cooled to 20° C. The polymer was allowed to settle and the supernatent liquid siphoned off. The solid was treated with 1 part methanol with stirring, heated to 55° C. again and cooled to 20° C. The polymer was again allowed to settle and the supernatent liquid drawn off. The methanol treatment was repeated without heating and the liquid again drawn off. The polymer then was stirred with 2 parts distilled water and centrifuged. The damp powder was dried at 60° in vacuo in a rotary drier until there remained less than 0.2 percent volatile components.

(c) The resulting dried vinylidene chloride copolymer was dissolved in methyl ethyl ketone and adjusted to a 10 percent solution. A carboxy-ester-lactone copolymer as prepared in Preparation 2 was also dissolved in methyl ethyl ketone as a 10 percent solution. Homogeneous mixtures of the polymers of varying ratios were made by combining different volumes of the 10 percent methyl ethyl ketone solutions. The resulting mixtures were coated as barrier layers by conventional solvent-coating procedures.

EXAMPLE 2

A series of processing cover sheets were prepared by coating on a polyester film support a first layer of a copolymer, poly(butyl acrylate-co-acrylic acid) (30/70 weight ratio) at 19.4 g/m² and, secondly, a barrier layer of varying ratio of copolymer and carboxy-ester-lactone as shown in Table 1 below, all at the coverage 3.2 g/m². The vinylidene chloride copolymer had the composition as described in Example 1 and the carboxy-ester-lactone contained 1.1 meq/g of acid.

The effectiveness of the barrier layer in the cover sheet was measured by determining the "barrier layer breakdown," i.e., the time required to reduce the pH of a simulated laminated film unit to about pH 10 as measured by the color change of the indicator dye thymolphthalein from blue to colorless. The dye was contained in an element which consisted of a gelatin layer containing the thymolphthalein dye coated on a polyester film support. An alkaline solution containing 47 grams per liter of potassium hydroxide was employed in a pod and spread between the element containing the indicator dye and the cover sheet by passing the "sandwich" between a pair of juxtaposed pressure rollers in a manner of processing an integral-imaging-receiver, color image transfer element so that the developer layer thickness was 75 μm.

The "barrier layer breakdown" (Y) reported at each temperature is the average for five samples. The timing for each sample is time interval between lamination and the mean of the time when the indicator dye begins to decolorize and the time when the dye has completely changed color as determined by visual observation. Measurements were made over the range 13° to 60° C. An Arrhenius plot of log Y, representing time (sec), against reciprocal temperature, 1/T(°K.), approximated a straight line. The activation energy of the penetration of alkali through the layer (and its subsequent neutraliziation), $E_a$, the slope of this plot, was calculated from the formula:

$$E_a = 0.00458 \times \frac{\log Y^2/Y^1}{1/T^2 - 1/T^1},$$

$Y^2$ and $Y^1$ representing two values of barrier layer breakdown obtained at two representative tempertures on the line.

TABLE 1

| Coating | Ratio Terpolymer/Carboxy-ester-lactone | Activation Energy, Ea(kcal/mol) |
|---------|----------------------------------------|--------------------------------|
| 1 | 80/20 | 26.2 |
| 2 | 70/30 | 23.8 |
| 3 | 60/40 | 21.8 |
| 4 | 50/50 | 19.1 |
| 5 | Control* | 12.0 |

*Solvent-coated layer of cellulose acetate (40% acetyl) and poly(styrene-co-maleic anhydrate) in 95/5 ratio coated at 6.5 g/m² as described in U.S. Pat. No. 4,009,030.

Thus, by varying the ratios of vinylidene chloride terpolymer and carboxy-ester-lactone, a suitable activation energy can be selected over a fairly wide range. Increasing the thickness (coverage) of the layer increases the barrier layer breakdown interval but does not affect the energy of activation. The energies of activation of these single, solvent-coated barrier layers are substantially higher than that of the prior art barrier layer.

EXAMPLE 3

Two cover sheets, one containing a control barrier layer and the other a barrier layer of the present invention, were prepared by coating the following layers in the order indicated on a poly(ethyleneterephthalate) film support:

(1) an acid layer containing 15.5 g/m² of poly(n-butyl acrylate-co-acrylic acid) (70 weight percent acrylic acid); and (2) a barrier layer comprising cellulose acetate (40% acetyl) (4.31 g/m²) and poly(styrene-co-maleic anhydride) (0.11 g/m²) for the control or a barrier layer comprising a 1:1 mixture by weight of poly(acrylonitrile-co-vinylidene chloride-co-acrylic acid) (weight ratio 18/75/7) and the polymeric carboxyester-lactone produced by lactonization and esterification of poly(vinyl acetate-co-maleic anhydride) (weight ratio 1:1) having 1.1 meq of acid per g of copolymer at a coverage of 3.2 g/m².

The cover sheets were used to process a multicolor integral-imaging-receiver element prepared by coating the following layers in the order recited on a transparent poly(ethyleneterephthalate) film support (coverages in g/m² unless specified otherwise):

(1) image-receiving layer of a latex of poly(styrene-co-N-vinylbenzyl-N-benzyl-N,N-dimethylammonium sulfate-co-divinylbenzene) (2.2) and gelatin (2.2);

(2) reflecting layer of titanium dioxide (22) and gelatin (2.2);

(3) opaque layer of carbon black (2.7) and gelatin (1.7);

(4) cyan image dye-providing compound (0.54) having the formula:

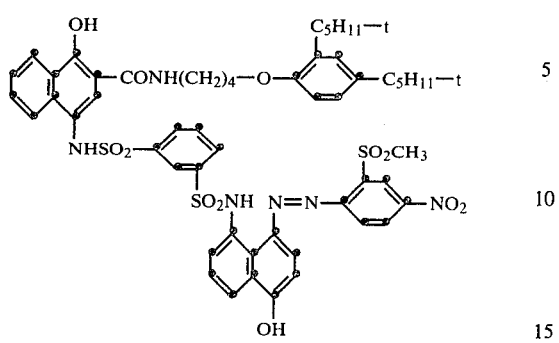

dispersed in 1,4-cyclohexylenedimethylene bis(2-ethyl hexanoate) and gelatin (1.1);

(5) red-sensitive, internal-image gelatin-silver bromide emulsion (1.1 silver; 1.1 gelatin), potassium 2-octadecylhydroquinone-5-sulfonate (16 g/mole silver) and nucleating agents 1-acetyl-2-{4-[5-amino-2-(2,4-di-t-pentylphenoxy)benzoamido]-phenyl}-hydrazine and 1-p-formylhydrazinophenyl-3-phenyl-2-thiourea (150 mg and 6 mg/mole silver, respectively);

(6) interlayer of gelatin (1.6) and 2,5-di-secdodecyl-hydroquinone (1.3);

(7) magneta image dye-providing compound (0.54) having the formula:

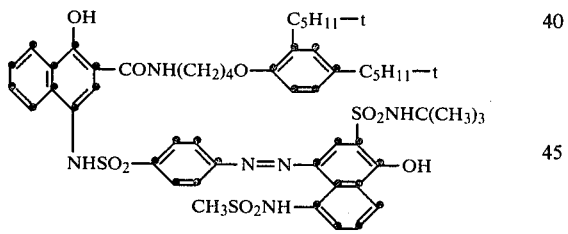

dispered in diethyl lauramide and gelatin (1.2);

(8) green-sensitive, internal-image gelatin-silver bromide emulsion (1.25 silver, 1.3 gelatin), potassium 2-octadecylhydroquinone-5-sulfonate (16 g/mole silver) and nucleating agents 1-acetyl-2-{4-[5-amino-2-(2,4-di-t-pentylphenoxy)benzoamido]-phenyl}hydrazine and 1-formylhydrazinophenyl-3-phenyl-2-thiourea (120 mg and 2.5 mg/mole silver, respectively);

(9) interlayer of gelatin (1.6) and 2,5-di-secdodecyl-hydroquinone (1.3);

(10) yellow image dye-providing compound (0.65) having the formula:

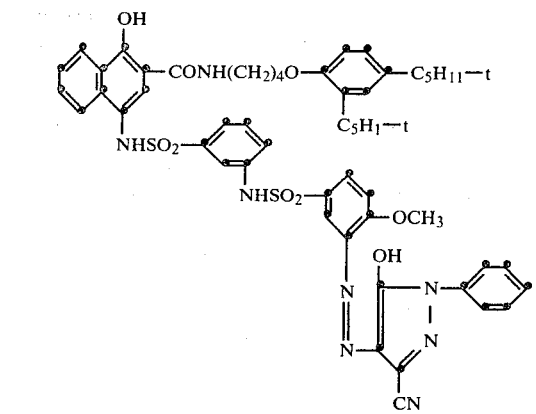

dispersed in 1,4-cyclohexylenedimethylene bis(2-ethyl hexanoate) and gelatin (1.1);

(11) blue-sensitive, internal-image gelatino-silver bromide emulsion (1.25 silver, 1.3 gelatin), potassium 2-octadecylhydroquinone-2-sulfonate (16 g/mole silver) and nucleating agent 1-p-formylhydrazinophenyl-3-phenyl-2-thiourea (5.8 mg/mole silver); and

(12) overcoat of gelatin (0.9) and 2,5-didodecylhydroquinone (0.11).

The above-prepared photosensitive elements were then exposed to a graduated-density multicolor test object. The following processing composition is employed in a pod and is spread between the photosensitive element and the cover sheet by passing the transfer "sandwich" between a pair of juxtaposed pressure rollers:

| | |
|---|---|
| potassium hydroxide | 47.0 g |
| sodium hydroxide | 3.4 g |
| methylhydroquinone | 0.1 g |
| t-butylhydroquinone | 0.3 g |
| 4-hydroxymethyl-4-methyl-1-phenyl pyrazolidone | 12.0 g |
| 5-methyl-1,2,3-benzotriazole | 3.8 g |
| carboxymethylcellulose | 66.8 g |
| dispersant | 8.8 g |
| sodium sulfite (anhydrous) | 1.0 g |
| benzyl alcohol | 1.0 g |
| carbon | 171.0 g |
| distilled water to total volume 1 liter | |

The sensitometric results listed in Table 2 were obtained by reflection densitometry by red, green and blue light through the film support about 3 hours after lamination.

TABLE 2

| | Control (variation from 22° C. to 35° C.) | | Example 3 (variation from 22° C. to 35° C.) | |
|---|---|---|---|---|
| | $\Delta D_{min}$ | $\Delta D_{max}$ | $\Delta D_{min}$ | $\Delta D_{max}$ |
| Red | 0.19 | 0.16 | 0.03 | 0.06 |
| Green | 0.19 | 0.17 | 0.05 | 0.02 |
| Blue | 0.12 | 0.14 | 0.02 | −0.09 |

The data in the table show that the use of a cover sheet comprising the single timing layer of the invention provides for improved processing temperature latitude. Although comparative values of the two cover sheets at 22° C. were essentially the same, at 35° C. the sample using the prior art timing layer shows the effect of overdevelopment while the same using the timing layer of the invention shows minimal changes.

EXAMPLE 4

A cover sheet of the invention was compared to a control cover sheet, which contained two barrier layers according to U.S. Pat. No. 4,061,496, by employing the exposed multicolor integral-imaging-receiver element and process described in Example 3.

The control cover sheet was comprised of a poly(ethyleneterephthalate) film support having coated thereon:

(1) an acid layer containing 15.5 g/m² of poly(n-butylacryate-co-acrylic acid) (70 weight percent acrylic acid);
(2) a barrier layer comprising cellulose acetate (40% acetyl) (4.31 g/m²) and poly(styrene-co-maleic anhydride) (0.11 g/m²);
(3) a second barrier layer comprising a latex of poly(acrylontrile-co-vinylidene chloride-co-acrylic acid) (2.15 g/m²).

The cover sheet of the invention was comprised of:
(1) an acid layer as described for the control; and
(2) a single barrier layer comprising a 1:1 mixture by weight of poly(acrylonitrile-co-vinylidene chloride-co-acrylic acid) (analyzed weight ratio of 17.6/70.6/6.73) and a polymeric carboxy-ester-lactone having 1.04 meq of acid per gram of copolymer coated at 3.2 g/m².

Samples of the cover sheets were evaluated for processing temperature latitude by processing as described in Example 3 using one sample at 16° C. and heating a second sample to 30° C., including the complete assemblage, processing for 15 seconds at 30° C. and then heating the assemblage to 52° C. for 4 minutes to complete the process.

The results are recorded in Table 3.

TABLE 3

|  | Control Cover Sheet | | | Invention Cover Sheet | | |
|---|---|---|---|---|---|---|
|  | $D_{min}$ | | | $D_{min}$ | | |
|  | 16° C. | 30–52° C. | $\Delta D_{min}$ | 16° C. | 30–52° C. | $\Delta D_{min}$ |
| Red | 0.19 | 0.44 | +.25 | 0.20 | 0.33 | +.13 |
| Green | 0.17 | 0.36 | +.19 | 0.18 | 0.28 | +.10 |
| Blue | 0.19 | 0.34 | +.15 | 0.19 | 0.26 | +.07 |

From these data, it can be seen that the variation in $D_{min}$ due to process temperature change is substantially reduced when employing a process cover sheet according to the invention.

EXAMPLES 5 THROUGH 24

Table 3 shows the wide variability of barrier layer compositions which can be used in processing cover sheets prepared as described in Example 2. The time required for breakdown of the barrier layer is affected by the acid content of both the vinylidene chloride copolymer and the polymeric carboxy-ester-lactone, the ratio of polymers, and the thickness of the layer (1 g/m² is roughly equivalent to 1 μm in thickness).

TABLE 3

| Example | Vinylidene Chloride Copolymer: Ratio of Monomers* | Polymeric Carboxy-ester-Lactone: Milleq. Acid Per Gram | Ratio of Vin. Chloride Copolymer to Carboxy-Ester-Lactone | Coverage g/m² | Barrier Layer Breakdown (sec at 22° C.) |
|---|---|---|---|---|---|
| Control | 15/85 /0 | NONE | 100/0 | 4.3 | over 2000 |
| 5 | 19.3/60.9/14.9 | 0.28 | 50/50 | 4.3 | 300 |
| 6 | 19.3/60.9/14.9 | 0.28 | 50/50 | 2.15 | 180 |
| 7 | 15/85 /0 | 1.34 | 25/75 | 2.15 | 90 |
| 8 | 15/85 /0 | 1.34 | 30/70 | 2.15 | 120 |
| 9 | 15/85 /0 | 1.34 | 35/65 | 2.15 | 160 |
| 10 | 15/85 /0 | 1.34 | 40/60 | 2.15 | 255 |
| 11 | 15/85 /0 | 1.34 | 50/50 | 2.15 | 730 |
| 12 | 15/85 /0 | 5.0 | 70/30 | 4.30 | 310 |
| 13 | 15/85 /0 | 5.0 | 70/30 | 3.80 | 210 |
| 14 | 15/85 /0 | 5.0 | 70/30 | 3.22 | 165 |
| 15 | 18.6/69.8/7.0 | 1.09 | 50/50 | 4.30 | 250 |
| 16 | 18.6/69.8/7.0 | 1.04 | 50/50 | 4.30 | 315 |
| 17 | 18.6/69.8/7.0 | 0.8 | 50/50 | 4.30 | 940 |
| 18 | 18.6/69.8/7.0 | 0.8 | 50/50 | 3.22 | 750 |
| 19 | 18.6/69.8/7.0 | 0.8 | 50/50 | 2.15 | 540 |
| 20 | 17.3/75.3/6.1 | 1.24 | 50/50 | 2.15 | 155 |
| 21 | 17.3/75.3/6.1 | 1.16 | 50/50 | 2.15 | 205 |
| 22 | 17.3/75.3/6.1 | 1.09 | 50/50 | 2.15 | 245 |
| 23 | 17.3/75.3/6.1 | 1.04 | 50/50 | 2.15 | 355 |
| 24 | 17.3/75.3/6.1 | 0.90 | 50/50 | 2.15 | 620 |

*Weight ratio of acrylonitrile/vinylidene chloride/acrylic acid, respectively.

The invention has been described in detail with particular reference to preferred embodiments thereof, but it will be understood that variations and modifications can be effected within the spirit and scope of the invention.

What is claimed is:

1. A composition comprising a mixture of (1) from 5 to 95 percent by weight of a copolymer comprising from 55 to 85 percent by weight of vinylidene chloride, 5 to 35 percent by weight of an ethylenically unsaturated monomer and 0 to 20 percent by weight of an ethylenically unsaturated carboxylic acid, and (2) from 5 to 95 percent by weight of a polymeric carboxy-ester-lactone.

2. The composition of claim 1 wherein said ethylenically unsaturated monomer is methyl acrylate or acrylonitrile.

3. The composition of claim 1 wherein said ethylenically unsaturated carboxylic acid is acrylic acid or itaconic acid.

4. The composition of claim 1 wherein said copolymer comprises 55 to 85 percent by weight of vinylidene chloride, 5 to 35 percent by weight of acrylonitrile and 2 to 10 percent by weight of acrylic acid.

5. The composition of claim 1 wherein said polymeric carboxy-ester-lactone comprises the following recurring structural units:

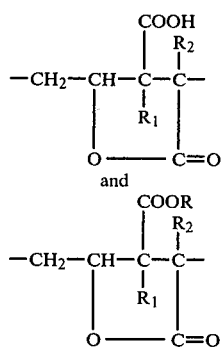

wherein:
R is alkyl having 1 to 12 carbon atoms, aralkyl wherein said alkyl comprises 1 to 4 carbon atoms; and
$R_1$ and $R_2$ are independently H or methyl.

6. The composition of claim 5 wherein R is n-butyl and $R_1$ and $R_2$ are H.

7. The composition of claim 5 additionally comprising the following recurring structural units:

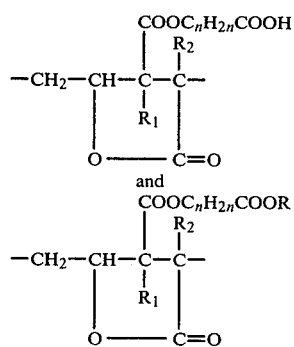

wherein n is an integer of from 1 to 5.

8. The composition of claim 5 wherein said polymeric carboxy-ester-lactone has 0.25 to 5.0 milliequivalents of acid per gram of said copolymer.

9. A composition comprising a mixture of (1) from 5 to 95 percent by weight of a copolymer comprising from 55 to 85 percent by weight of vinylidene chloride, 5 to 35 percent by weight of an ethylenically unsaturated monomer and 0 to 20 percent by weight of an ethylenically unsaturated carboxylic acid, and (2) from 5 to 95 percent by weight of a polymeric carboxy-ester-lactone, said mixture being dissolved in an organic solvent.

10. The composition of claim 9 wherein said copolymer comprises 55 to 85 percent by weight of vinylidene chloride, 5 to 35 percent by weight of acrylonitrile and 2 to 10 percent by weight of acrylic acid.

11. The composition of claim 9 wherein said polymeric carboxy-ester-lactone comprises the following recurring structural units:

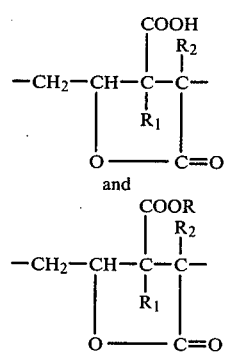

wherein:
R is alkyl having 1 to 12 carbon atoms or aralkyl wherein said alkyl comprises 1 to 4 carbon atoms; and
$R_1$ and $R_2$ are independently H or methyl.

12. The composition of claim 10 wherein the lactone additionally comprises the following units:

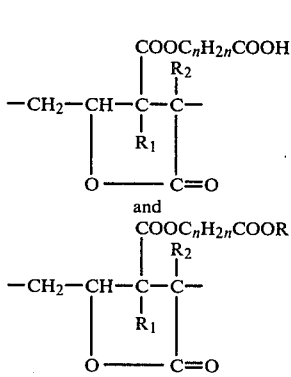

wherein n is an integer of from 1 to 5.

13. A composition comprising a mixture of (1) 60 percent by weight of poly(acrylonitrile-co-vinylidene chloride-co-acrylic acid) having a weight ratio of 14/80/6, and (2) 40 percent by weight of the polymeric carboxy-ester-lactone produced by lactonization and esterification of poly(vinyl acetate-co-maleic anhydride) (1:1) with n-butanol and having 0.25 to 5.0 milliequivalents of acid per gram of said carboxy-ester-lactone, said mixture being dissolved in an organic solvent.

* * * * *